United States Patent [19]

Lemelson

[11] Patent Number: 5,337,488
[45] Date of Patent: Aug. 16, 1994

[54] MEASURING INSTRUMENT AND METHOD

[76] Inventor: Jerome H. Lemelson, 868 Tyner Way, Incline Village, Nev. 89450

[21] Appl. No.: 991,509

[22] Filed: Dec. 17, 1992

Related U.S. Application Data

[63] Continuation of Ser. No. 549,553, Jul. 9, 1990, abandoned, which is a continuation of Ser. No. 279,307, Dec. 1, 1988, abandoned, which is a continuation of Ser. No. 591,672, Mar. 20, 1984, abandoned, which is a continuation-in-part of Ser. No. 275,630, Jun. 22, 1981, Pat. No. 4,437,241, which is a continuation-in-part of Ser. No. 68,609, Aug. 22, 1979, abandoned.

[51] Int. Cl.$^5$ .............................................. G01B 7/02
[52] U.S. Cl. ....................... 33/784; 33/819; 364/560
[58] Field of Search ............... 33/784, 783, 813, 815, 33/819, 820; 364/560-564

[56] References Cited

U.S. PATENT DOCUMENTS

| | | | |
|---|---|---|---|
| 3,226,833 | 1/1966 | Lemelson | 33/166 X |
| 3,924,336 | 12/1975 | Inoue | 33/819 |
| 4,103,427 | 8/1978 | Ledley | 33/819 |
| 4,161,781 | 7/1979 | Hildebrandt et al. | 33/140 X |
| 4,176,460 | 12/1979 | Kaye | 33/178 E X |
| 4,437,241 | 3/1984 | Lemelson | 33/819 |

Primary Examiner—William A. Cuchlinski, Jr.
Assistant Examiner—C. W. Fulton
Attorney, Agent, or Firm—J. Kevin Parker

[57] ABSTRACT

A measuring device, such as a micrometer or other form of dimensional measuring instrument, is provided which is operable to indicate dimensional measurements made thereby in numerical form on a display, such as an electronic digital display. The measuring device or micrometer is controlled to generate digital electrical signals which are indicative of a measurement, which signals of each measurement are recorded in an electronic memory which may be supported by the device or connected thereto. The memory is employed to both indicate each measurement as it is made and to record all or selected measurements made for future reference. Other information generated, for example, by a suitable input means such as a keyboard, and defining such variables as part number, part lot, time and date of measurement, etc. may be recorded in such memory along with the recording or recordings of data defining the measurements made.

20 Claims, 2 Drawing Sheets

MEASURING INSTRUMENT AND METHOD

This is a continuation of Ser. No. 07/549,533 filed Jul. 9, 1990, now abandoned, which is a continuation of Ser. No. 07/279,307 filed Dec. 1, 1988, now abandoned, which is a continuation of Ser. No. 06/591,672 filed Mar. 20, 1984, now abandoned, which is a continuation-in-part of Ser. No. 06/275,630 filed Jun. 22, 1981, now U.S. Pat. No. 4,437,241, which is a continuation-in-part of Ser. No. 06/068,609 filed Aug. 22, 1979, now abandoned.

SUMMARY OF THE INVENTION

This invention relates to measuring devices, such as micrometers or similar types of manual or bench measuring devices, employed for measuring dimensions of objects wherein an indication of the dimension being measured is obtained along a display, print-out or sounds of words or a combination of such indicating means. The measuring device includes a surface or force sensing element sensing when a surface contacting element is applied with a predetermined force to a surface of the workpiece, when the other surface of the workpiece is engaged against an anvil or other form of surface positioning means therefor so that the distance between the surface contacting elements or two surfaces of the work which they contact may be measured and indicated by means of a code signal or signals which may be utilized to control the operation of a display and record it in a memory. Input means, such as a digital signal generating coded keyboard, may be employed to record additional data along with the recordings of data indicative of the measurements made, such as code signals indicating the part, dimension measured, lot number, time and date of measurement, production run, etc. As a result, a single instrument may be operated in an efficient manner to rapidly effect and record information relating to measurements made with respect to indicated parts and dimensions of such parts so measured to provide a log or record of the measurements and the production pieces so measured. As a result, manual operations and errors are eliminated or substantially reduced as is the time required to make and record measurements. The device and method also includes means for transferring data relating to measurements made and identifying dimensions and parts so measured from a memory in the measuring device or instrument to a memory or recorder associated with a larger or central computer employed to track, control and analyze measuring operations relating to a production facility or a particular product composed of a number of components which are so measured.

Accordingly it is a primary object of this invention to provide a new and improved apparatus and method for effecting dimensional measurements of articles of manufacture.

Another object is to provide a new and improved measuring instrument, such as a micrometer, for effecting and indicating dimensional measurements.

Another object is to provide a device for measuring dimensions, recording information relating to a plurality of measurements and providing such information in an available form, when needed or recalled, for controlling a visual display, printer or synthetic speech generating means to indicate to a person or persons the results of a selected measurement or a plurality of measurements made by the instrument.

Another object is to provide a micrometer which indicates a measurement made thereby and simultaneously records information of the measurement made for future recall or analysis.

Another object is to provide a micrometer which both visually and by means of synthetic speech sounds, indicates dimensions which are measured thereby both when the measurements are made and at a future time.

Another object is to provide a measuring system and method for measuring and recording information relating to dimensional measurements made and permitting the selective recalling or reproduction of such information for future use or analysis.

Another object is to provide a measuring system and method for making dimensional measurements, indicating such dimensional measurements on a display as each measurement is made and recording information relating to each measurement, after it is made, either automatically or in response to an action taken by a person operating the instrument or device.

Another object is to provide a measuring instrument in the form of a unitary assembly containing measuring means operable to generate signals indicative of each measurement made and to record in a memory supported by the assembly, information relating to a plurality of measurements and including manually operable means for playing back or reproducing all or selected portions of such information and applying same either to a visual indicating means for a remote computer or record keeping and analysis.

BRIEF DESCRIPTION OF DRAWINGS

With the above and such other objects in view as may hereinafter more fully appear, the invention consists of the novel construction, combinations and arrangements of parts which will be hereafter more fully described and illustrated in the accompanying drawings, wherein are shown embodiments of the invention, but it is to be understood that changes, variations and modifications may be resorted to which fall within the scope of the invention as claimed without departing from the spirit and nature of the invention.

In the drawings.

DETAILED DESCRIPTION

Figure 1:
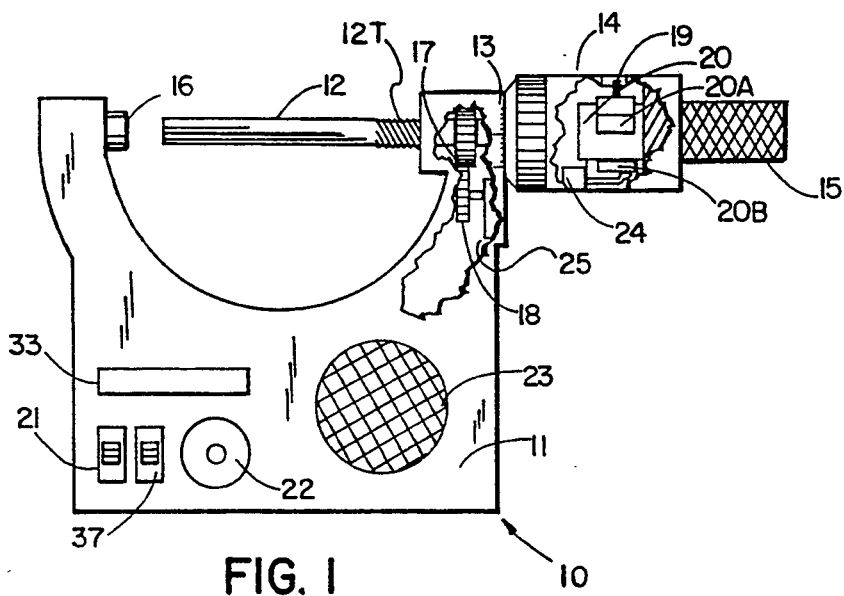
FIG. 1 is a side view with parts broken away for clarity of a hand-held measuring instrument in the form of a micrometer including electrical and electronic means for indicating a measurement made thereby.

In FIG. 1 is shown a measuring device 10, such as a micrometer, having a fixed dimension housing 11 defining a rigid frame for supporting a threaded spindle 12, a graduated sleeve 13, a thimble 14, a spring loaded knurled adjustment knob 15, an anvil 16, a spindle mounted gear 17, a potentiometer 25 with an attached gear 18 which meshes with the spindle gear 17, a spring loaded shaft 20 containing respective protruding teeth or cams 20A and 20B, a normally open limit switch 24, an on/off switch 21, a push button switch 22 for operating a display 33 and an opening 23 in the side wall of housing 11 across which opening a speaker is supported. Shaft 20 is a continuation of the knurled adjustment knob 15 or is operatively connected thereto for rotation therewith A desired measurement may be made in a conventional manner wherein an object, a dimension of which is to be determined, is placed between the end surface of the spindle 12 and the anvil 16 The adjustment knob 15 is rotated causing the thimble 14 to rotate therewith by torque applied through the tooth 20A to spring 19 which is anchored within the thimble housing 14. A threaded portion 12T of the spindle 12 engages within a threaded collar (not shown) supported within the housing of the sleeve 13 causing movement of the spindle 12 toward and away from the anvil 16 depending on the direction of its rotation in a manner in which a conventional micrometer is operated. When the end of the spindle 12 has engaged a surface of an object being measured, further rotation of knob 15 causes compression of spring 19 by engagement of tooth 20A thereagainst causing relative rotation of the shaft 20 with respect to the thimble 14. When a predetermined torque is applied to knob 15 thereafter, shaft 20 rotates sufficiently to cause tooth 20B to actuate a normally open limit switch 24 causing a measurement reading to be effected as described hereafter. As the spindle 12 is advanced towards the anvil 16, gear 17 meshes with and rotators gear 18 which is connected to rotate a multiturn potentiometer 25 causing subsequent operation as described hereafter.

Figure 2:
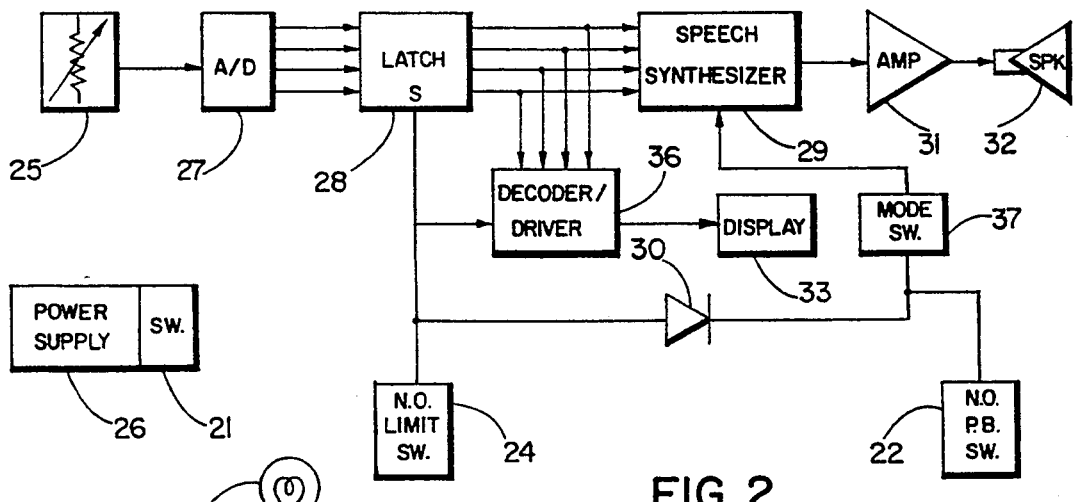
FIG. 2 is a schematic diagram of the subsystem electronic components of the device illustrated in FIG. 1.

In FIG. 2, which schematically illustrates a typical electronic arrangement involving the micrometer 10, a suitable power supply 26, such as a replacable or rechargable battery with an on/off switch 21, is provided to power the electronics of the system. The position of spindle 12, which is representative of the distance between the end of the spindle end the face of the anvil 16, is defined by electrical signals defined by potentiometer 25, which signals are subsequently converted to digital form by an analog-to-digital converter 27, the output of which is applied to a multiple bit latch 28. When proper torque is applied to the knob 15, normally open limit switch 24 causes the latch 28 to be set and activates a speech synthesizer 29, such as a Texas Instrument Corp. TMC 0280 integrated circuit with support circuits, via an isolation diode 30 and a mode switch 31. The speech synthesizer 29 outputs an electric signal which is representative of a verbalization of data input to synthesizer 29 from multiple bit latch 28. This signal is amplified in an amplifier 31 and audibly reproduced by a speaker 32. The limit switch also provides power to a decoder-driver 36 which causes data input from the latch 28 to be visually presented by a numerical display 33.

Information representative of the measurement being made is held in the latch 28, so that micrometer 10 may be removed from the work and transported to another location where it may again be heard by momentary activation of a push button read switch 22. Closure of switch 22 causes energization of the speech synthesizer 29 via a mode switch 37, to repeat the measurement representation. This procedure may be repeated as often as required. Memory information from the multiple bit latch 28 is lost whenever power is turned off or a subsequent measurement causes reactivation of the limit switch 24.

Figure 3:
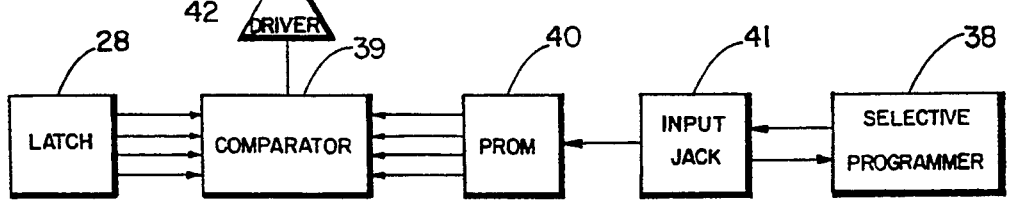
FIG. 3 is a schematic diagram of a variation in the electronic system illustrated in FIG. 2.

In FIG. 3, output from the multiple bit latch 28 is also shown as input to a comparator 39. An input jack 41 provides access to enter information defining a tolerance range into a programmable read only memory (PROM) 40 by means of a selective programmer 38. The PROM 40 is also input to comparatator 39. When data from the latch 28 is generated which is within the tolerance range established in the memory of the PROM, a time signal is sent to a driver 42 to power an indicator 34. In this manner, the micrometer may be used as a quality control device or to detect specific defects.

Figure 4:
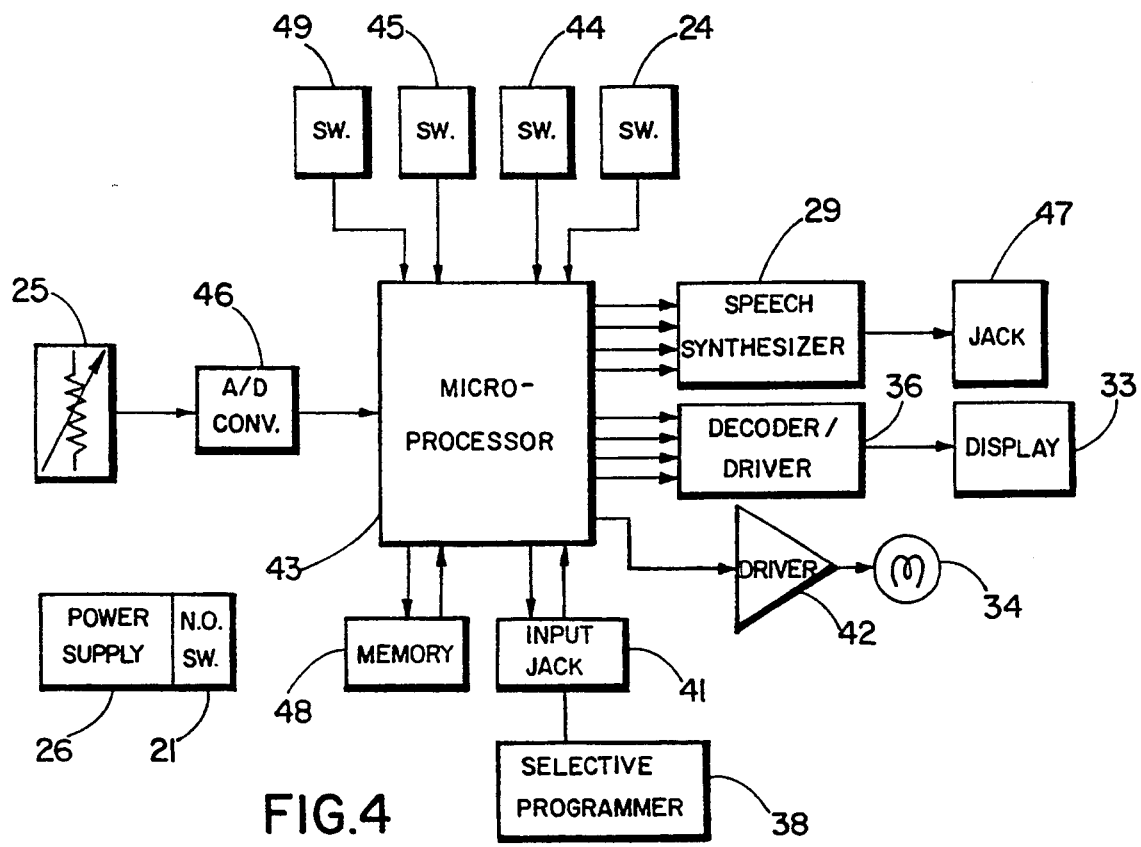
FIG. 4 is a schematic diagram illustrating yet another embodiment of the invention.

In FIG. 4, electrical energy from a power supply 26 such as provided in FIG. 2, is utilized and measurement information is converted to electrical signals by a potentiometer 25 as described in FIG. 1. These signals are input by means of an analog-to-digital converter 46 to a microprocessor 43 powered by the above mentioned power supply. A read-out switch 49 is connected to the microprocessor as are an indicator switch 44 and a tolerance deviation switch 45. A signal from the read-out switch 49 to the microprocessor causes the measurement signal input to the microprocessor to be visually presented on a visual character display 33 by means of a decoder/driver 36 and to be audibly produced by a speech synthesizer 29 which is connected to an earphone jack 47. A headset or earphone connected to this jack insures clarity and volume over background noises in factories and shops. The indicator switch 44 directs the microprocessor 43 to signal a driver device 42 to power an indicator 34 whenever the input measurement is within a range defined by information which has been previously entered into a programmable memory 48. Input jack 41 provides two-way access to the microprocessor 43 by a selective programmer 38 so that tolerance range or ranges may be entered, measured parts which are both within or out of the tolerance range can be counted, etc. The tolerance deviation switch 45 is provided to signal the microprocessor to compute and represent the deviation from the desired value or range.

Figure 5:
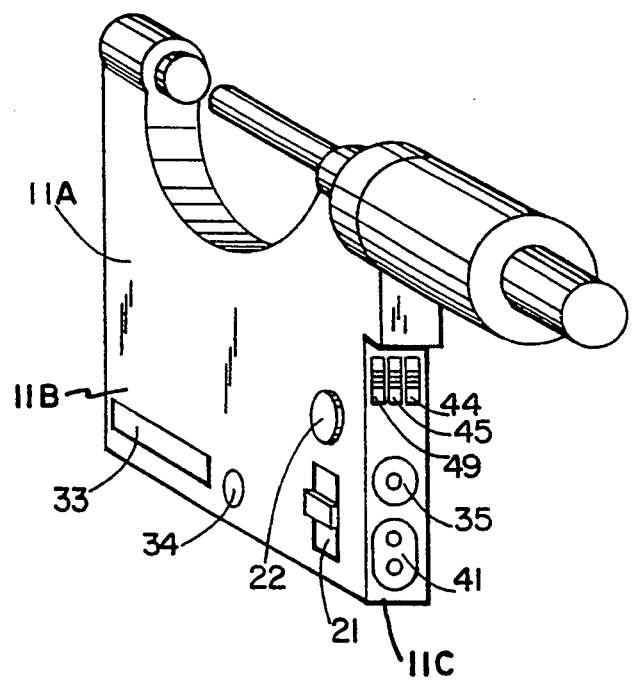
FIG. 5 is an isometric view of a micrometer containing features disclosed in FIG. 4.

In the embodiment illustrated in FIG. 5, which contains the electronic measuring circuits of FIG. 4, housing 11A supports on-off switch 21 located on the sidewall 11B thereof which also supports a normally off push-button switch 22 for energizing display 33 which is selectively activated when switch 49 is closed and causes signals recorded in the memory of the microprocessor 43 to drive display 33. Also supported by the sidewall 11B of the housing 11A is indicator light 34 for indicating if the measurement just made or recorded in the memory of the microprocessor 43 is within a given tolerance.

The endwall 11C of housing 11A supports the described manual switches 44,45 and 49 as well as input receptacles 35 and 41 for respectively accommodating a microphone lead and to input command signals to the microprocessor 43 as generated by a computer keyboard or other device located externally of the micrometer housing 11A. Receptacle 41 or another such receptacle supported by the housing 11A may be employed to receive signals generated from the memory or active circuits of the microprocessor 43 and indicative of the last measurement or groups of measurements made, in response to a query signal or the activation of another control switch supported by the housing, which latter signals may be transmitted to a memory or remote computer for record keeping and other quality control or machine control purposes.

It is also noted that the described signal processing, speech synthesizing and sound generating circuits as well as the speaker and display may be provided in a separate housing and connected to the potentiometer and switches associated with the micrometer through a flexible cable.

While the micrometer shown in FIGS. 1 and 5 is operable to measure outside dimensions of objects, it may also be constructed in accordance with known measuring instruments for measuring inside diameters, height or other variables which, are announced by means such as provided herein. Other known measuring devices for measurements such as surface roughness, web thickness, distance (including radar and sonar distance instrumentation), defect measuring devices and circuits, vibration analysis instrumentation, beam scanning image analysis, nuclear magnetic resonance measuring and scanning electron microscope apparatus may be provided which generate signals indicative of measurements such as quantitative measurements of dimensional, area, signal characteristics, pressure, temperature, electrical resistance, potential, amperage, power, noise, and other variables which are to be determined by means of associated instrumentation, may be employed with speech synthesizing and word generating means as described to provide the user or users thereof with vocal indications as well as visual presentations of specific measurements so made to facilitate the measuring procedure, reduce the degree of attention required, free the operator's hand or vision for, performing other functions and to allow blind persons to operate same.

It should be understood with respect to all of the embodiments described above, that power supplies having the correct polarities and magnitudes are provided where not indicated in the drawings so as to supply proper electrical energy for appropriately operating the various illustrated components and circuits as described in the specification.

Additional variations in the broad instant invention are noted as follows:

(A). The microprocessor of FIG. 4 may contain a memory and may be operable to store a plurality of different measurements made by the micrometer together with code signals indicative of the respective article or part and the dimension thereof defined by the signals indicating such measurements. Control means, either in the form of switches supported by the micrometer or a keyboard which is pluggably connectable to the micrometer circuits, may be employed to selectively derive display and synthetic speech signal of all or selected of a plurality of measurements made to provide such information in intelligible form for monitoring purposes.

(B). The micrometer 10 may also contain a connector for pluggably connecting the recording circuits or memory of the microprocessor containing recordings of measurements made with an external computer or recorder to present one or more of the measurement indicating dimensions and work identification signals described to the computer for record keeping, analysis and quality control purposes.

(C). The microprocessor 43 may also be operable to generate digital code signals indicative of the dimensions measured as well as dimension identifying signals recorded therein in pulse or time code form, which code signals may be selectively fed to activate a speaker associated with the speech synthesizer 29 so that acoustic coupling may be effected between such speaker and an external microphone for transmitting such coded information to a computer or recorder on an audio circuit or communication system such as a telephone communication system.

(D). The system and technique described may be used to indicate with synthetically generated sounds of speech dimensions measured by the use of computerized or computer assist automatic measurement systems such as multi-axis automatic measurement machinery of the types manufactured by the Bendix Corporation of Southfield, Mich. wherein speech indications may be selectively provided for the operator or user of such machinery of particular dimensions being measured.

(E). The measurement technique and synthetic speech generating means described may also be employed in other measurement systems such as beam scanning systems employing image analyzing computers wherein image fields are scanned and the resulting data digitized and automatically analyzed by a computer which generated signals indicative, not only of specific measurements, but also of such physical phenomena as areas, faults or flaws identified or indications of specific shapes in the image field wherein the image analyzing computer detection and identification is indicated by code signals which are employed to generate synthetic speech indications of such phenomena as described.

(F). The synthetic speech generating means described may also be employed to verbally indicate conditions detected by means of radar wherein automatic image analysis of the images generated on a radar screen is employed, by means of a computer, to provide certain verbal warnings and audio speech signals thereof to be broadcast to a remote receiver, such as a radio receiver of the pilot of an aircraft which is effected by or is intended to operate thereafter in accordance with the characteristics of the radar information generated.

It is noted that the speech synthesizing circuit 29 is also operable and controlled in its operation to generate one or more words other than words of numbers such as the word "point" indicating a decimal point in the number indicating the measurement made. It may also be operable to generate signals defining words which indicate that particular measurements made are for dimensions which are acceptable or are out of tolerance in accordance with signals derived from one or more memories which are compared with those derived from actual measurements made.

(G) Memory 48 of FIG. 4 or another microelectronic memory or chip operatively connected to microprocessor 43 and having the capability of erasably storing variable information therein, may be employed to record such digital data as codes indicative of measurements made such as the codes employed to activate the speech synthesizing circuits 29 and/or the decoder-driver 36 when gated thereto through the microelectronic processor 43. Such recordings of signals indicating measurements made by the measuring instrument or micrometer may be recorded along with other variable data such as one or more codes indicative of one or more variables such as part dimensions measured, part or lot number, date or time of measurement and inspector or machine operator number. Such latter additional information may be generated by one or more input means connected to the electronic system or microprocessor through a flexible cable and extending from a keyboard, light pen or other code reading device activated by the operator of the micrometer to read a code, such as a bar code, printed on a sheet, provided on a card or recorded on the part or assembly being measured or inspected. Such a code reading transducer or keyboard may also be supported by the measuring instrument or micrometer itself such as by a select portion of the housing 11 or 11A and conveniently operable by the user of the micrometer. Such recorded information recorded in the electronic memory may be selectively reproduced therefrom by selectively activating the keys and switches of the keyboard to provide such information in the described speech-sound form and/or on one or more lines of the electronic display 33. Such recorded information may also be serially read out into a computer, remote memory or hard copy generator such as a printer to provide a visually readable copy of all or selected measurements made with the instrument.

(H) The physical arrangement of components illustrated in FIGS. 1 and 5 which define micrometer type of measuring instruments containing, in addition to electronic circuit elements and components of the types illustrated in FIGS. 2, 3 and 4 all supported within a housing defined by the C-shaped frame or support 11, may be modified to include, either supported by such housing or separate therefrom and connected thereto, a manually operable keyboard or other means for inputting data to control or be selectively recorded along with the data defining the measurements made in the described measurement signal memory. Such keyboard or other form of input means such as a bar code reading light pen, magnetic card or strip reading device, may be employed to selectively generate information signals indicative of such variables as time of day, date, part or product number, lot number, production run, production quantity, or other dimensional information such as tolerance and to apply same, either directly to the memory or to the microprocessor 43 for controlling the recording of such information or employing same to control the operation of the micrometer and its display or speech indicating means. In other words, switches denoted 44, 45 and 49 may be supplemented by additional manually operable pushbutton switches, sufficient in number to effect the desired modes and types of control of the instrument and/or information recorded along with the signals indicative of the individual measurements made thereby, selective erasure of such information and the selective transfer of such information.

I claim:

1. A method for performing and indicating a measurement of a physical variable, comprising the steps of:
   measuring the physical variable and generating a first signal relating thereto;
   storing said first signal wherein said first signal is stored with an identification code relating to the particular measurement performed:
   retrieving said first signal in response to an inputting of said identification code;
   comparing a previously stored second signal with said first signal and generating a third signal relating to the comparison; and,
   outputting an audible indication of said third signal.

2. The method as set forth in claim 1 wherein said second signal is a previously stored version of said first signal and said third signal is a synthetic speech representation of said measured physical variable.

3. The method as set forth in claim 1 wherein said second signal is a previously stored representation of a nominal value of the measurement performed, and said third signal is generated when said comparison indicates that said first signal deviates from said second signal by more than a specified tolerance range.

4. The method as set forth in claim 1 wherein said identification code includes the time at which the particular measurement is performed.

5. The method as set forth in claim 1 wherein said physical variable relates to an object, and said identification code includes an identification of the particular object measured.

6. The method as set forth in claim 5 wherein said physical variable is a dimension of the object, the measurement being performed by positioning first and second contacting means across a portion of the object and generating said first signal in accordance with the positions of said contacting means.

7. The method as set forth in claim 6 wherein said first and second contacting means are positioned across a portion of the object by moving one of said contacting means toward the other with a portion of the object interposed therebetween until a specified force is applied to the object at which point said first signal is generated.

8. The method as set forth in claim 1 further comprising the step of outputting a visual indication of said third signal which is a representation of said measured variable.

9. The method as set forth in claim 8 wherein said visual indication is a hard copy printout.

10. The method as set forth in claim 8 wherein said visual indication is an electronic display.

11. The method as set forth in claim 1 wherein said identification code is input by means of a manual keyboard.

12. An instrument for measuring the dimension of an object, comprising
   means for inputting an identification code relating to a particular measurement;
   first and second contacting means for positioning therebetween a portion of the object to be measured;
   means for moving one of said contacting means toward the other until the relative positions of the contacting means represents the dimension the object portion to be measured;
   means for generating a first signal relating to the positions of the contacting means;
   means for storing said first signal;
   means for storing said first signal relating to a particular measurement in association with said identification code;
   means for retrieving said stored first signal in response to the inputing of said identification code;
   means for comparing a previously stored second signal with said first signal and generating a third signal relating to the comparison: and,
   means for outputting an audible indication of said third signal.

13. The instrument as set forth in claim 12 wherein said second signal is a previously stored version of said first signal and said third signal is a synthetic speech representation of said measured dimension.

14. The instrument as set forth in claim 12 wherein said second signal is a previously stored representation of a nominal value of the dimension to be measured and further comprising means for generating said third signal when said comparison indicates that said first signal deviates from said second signal by more than a specified tolerance range.

15. The instrument as set forth in claim 12 further comprising means for outputting visual representation of the dimension measured in accordance with said third signal.

16. The instrument as set forth in claim 12 further comprising means for ensuring a specified force is applied to said object by said contacting means when said first signal is generated.

17. The instrument as set forth in claim 16 wherein said force ensuring means comprises a spring acted upon by one of said contacting means when said contacting means is mowed toward the other with an electrical contact being actuated when the force applied to said object by said contacting means exceeds a specified force determined by the spring constant of said spring.

18. The instrument as set forth in claim 17 wherein said first and second contacting means comprise an anvil and a spindle, wherein said spindle is moved toward said anvil when said spindle is rotated, and further comprising an adjustment knob operatively connected to said spring for rotating said spindle.

19. A measuring instrument, comprising:
   means for inputting an identification code relating to a particular measurement;
   surface sensing means and means for prepositioning a portion of an object to be measured with respect to said surface sensing means;
   means for effecting relative scanning movement between said surface sensing means and said object to effect an automatic measurement;
   means for generating a first signal relating to said automatic measurement;
   means for storing said first signal;
   means for storing said first signal relating to a particular measurement in association with said identification code;
   means for retrieving said stored first signal in response to the inputting of said identification code;
   means for comparing a previously stored second signal with said first signal and generating a third signal relating to the comparison; and,
   means for outputting an audible indication of said third signal.

20. The instrument as set forth in claim 19 wherein said automatic measurement is a dimensional measurement.

* * * * *